United States Patent
Gong et al.

(10) Patent No.: US 10,691,893 B2
(45) Date of Patent: Jun. 23, 2020

(54) INTEREST HIGHLIGHT AND RECOMMENDATION BASED ON INTERACTION IN LONG TEXT READING

(71) Applicant: International Business Machines Corporation, Armonk, NY (US)

(72) Inventors: Min Gong, Shanghai (CN); Yuan Ni, Shanghai (CN); Junchi Yan, Shanghai (CN); Hui J. Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 15/056,492

(22) Filed: Feb. 29, 2016

(65) Prior Publication Data
US 2017/0249296 A1 Aug. 31, 2017

(51) Int. Cl.
G06F 3/0482 (2013.01)
G06F 40/295 (2020.01)
G06F 3/0488 (2013.01)
G09G 5/00 (2006.01)
G06F 40/169 (2020.01)

(52) U.S. Cl.
CPC .......... *G06F 40/295* (2020.01); *G06F 3/0482* (2013.01); *G06F 3/0488* (2013.01); *G06F 40/169* (2020.01); *G09G 5/00* (2013.01); *G09G 2354/00* (2013.01)

(58) Field of Classification Search
CPC .................................................. G06F 3/0482
USPC ..................................................... 715/811
See application file for complete search history.

(56) References Cited

U.S. PATENT DOCUMENTS 5,347,295 A * 9/1994 Agulnick .............. G06F 1/1643
345/156
5,819,261 A * 10/1998 Takahashi ............... G06F 16/40
(Continued)

OTHER PUBLICATIONS

Kim et al., "Content-Aware Kinetic Scrolling for Supporting Web Page Navigation", MIT CSAIL; KAIST; Harvard SEAS; UIST'14, Oct. 5-8, 2014, http://groups.csail.mit.edu/uid/other-pubs/uist2014-juhokim-caks.pdf.

(Continued)

*Primary Examiner* — Daniel Rodriguez
(74) *Attorney, Agent, or Firm* — Scully, Scott, Murphy & Presser, P.C.; Joseph Petrokaitis, Esq.

(57) ABSTRACT

A method, system and computer program product are disclosed for recommending terms in a document based on a specified interaction with the document. In one embodiment, the method comprises displaying a document on a device; detecting a specified interaction with the document displayed on the device; identifying text associated with the specified interaction with the document displayed on the device; performing object recognition with the identified text to recognize one or more defined interested objects; and recommending terms in the document based on the recognized defined interested objects. In an embodiment, the object recognition includes identifying one or more objects from the text, and performing the object recognition with these objects to recognize the one or more interested objects. In an embodiment, one or more terms are extracted from the text, and these terms are partitioned to identify the one or more objects from the text.

16 Claims, 11 Drawing Sheets

(56) References Cited

U.S. PATENT DOCUMENTS

| | | | | |
|---|---|---|---|---|
| 5,963,965 A * | 10/1999 | Vogel | G06F 16/338 | 715/236 |
| 6,470,307 B1 * | 10/2002 | Turney | G06F 16/30 | 704/9 |
| 7,360,151 B1 * | 4/2008 | Froloff | G06F 40/186 | 715/255 |
| 8,542,205 B1 * | 9/2013 | Keller | G06F 3/0488 | 345/173 |
| 9,082,148 B1 * | 7/2015 | Oczkowski | G06Q 30/0601 | |
| 9,449,080 B1 * | 9/2016 | Zhang | G06F 40/20 | |
| 2003/0061200 A1 * | 3/2003 | Hubert | G06Q 30/0601 | |
| 2003/0140309 A1 * | 7/2003 | Saito | G06F 16/345 | 715/259 |
| 2007/0048715 A1 * | 3/2007 | Miyamoto | G06F 40/258 | 434/308 |
| 2007/0239452 A1 * | 10/2007 | Madhavan | G06Q 30/02 | 704/252 |
| 2008/0046925 A1 * | 2/2008 | Lee | G11B 27/11 | 725/37 |
| 2008/0077581 A1 * | 3/2008 | Drayer | G06F 16/9535 | |
| 2008/0177994 A1 * | 7/2008 | Mayer | G06F 9/4418 | 713/2 |
| 2008/0249785 A1 * | 10/2008 | Kinjou | G06Q 10/10 | 705/1.1 |
| 2008/0313221 A1 * | 12/2008 | Seki | G06F 16/93 | |
| 2009/0193337 A1 * | 7/2009 | Carter | G06F 3/0481 | 715/277 |
| 2009/0318777 A1 * | 12/2009 | Kameyama | G06F 16/24575 | 600/301 |
| 2010/0082570 A1 * | 4/2010 | Altaf | G06F 16/332 | 707/706 |
| 2011/0106809 A1 * | 5/2011 | Akiyama | G06F 16/9535 | 707/740 |
| 2011/0131221 A1 * | 6/2011 | Bhide | G06F 16/951 | 707/755 |
| 2011/0191369 A1 * | 8/2011 | Mehra | G06F 16/94 | 707/769 |
| 2011/0276921 A1 * | 11/2011 | Long | G06F 16/9535 | 715/825 |
| 2011/0282874 A1 * | 11/2011 | Xu | G06F 16/313 | 707/737 |
| 2011/0288935 A1 * | 11/2011 | Elvekrog | G06Q 30/0241 | 705/14.53 |
| 2012/0078612 A1 * | 3/2012 | Kandekar | G06F 40/258 | 704/9 |
| 2012/0084657 A1 * | 4/2012 | Ranade | G06F 16/955 | 715/733 |
| 2012/0095834 A1 * | 4/2012 | Doig | G06F 16/9535 | 705/14.53 |
| 2012/0167010 A1 * | 6/2012 | Campbell | G06F 3/0482 | 715/825 |
| 2012/0245996 A1 * | 9/2012 | Mendez | G06Q 30/0241 | 705/14.49 |
| 2012/0246100 A1 * | 9/2012 | Shehata | G06F 16/345 | 706/12 |
| 2012/0254797 A1 * | 10/2012 | Nagahama | G06F 16/3329 | 715/816 |
| 2012/0303358 A1 * | 11/2012 | Ducatel | G06F 40/30 | 704/9 |
| 2013/0054371 A1 * | 2/2013 | Mason | G06Q 30/02 | 705/14.64 |
| 2013/0124515 A1 * | 5/2013 | Ghimire | G06F 16/248 | 707/728 |
| 2013/0151533 A1 * | 6/2013 | Udupa | G06F 16/3325 | 707/742 |
| 2013/0159885 A1 * | 6/2013 | Yerli | G06Q 10/10 | 715/753 |
| 2014/0062877 A1 * | 3/2014 | Lee | G06F 1/1694 | 345/158 |
| 2014/0089867 A1 | 3/2014 | Jang | | |
| 2014/0229838 A1 | 8/2014 | Xue | | |
| 2014/0324885 A1 * | 10/2014 | McKenzie | G06F 16/5866 | 707/748 |
| 2015/0012520 A1 * | 1/2015 | An | G06F 3/0488 | 707/711 |
| 2015/0032599 A1 * | 1/2015 | Agapitov | G06Q 20/227 | 705/39 |
| 2015/0089409 A1 * | 3/2015 | Asseily | G06Q 10/10 | 715/765 |
| 2015/0221017 A1 * | 8/2015 | Oguro | G06F 16/248 | 705/14.53 |
| 2015/0301696 A1 * | 10/2015 | D'Jesus Bencci | G06F 3/0482 | 715/752 |
| 2015/0324342 A1 * | 11/2015 | Chin | G06F 16/9535 | 715/231 |
| 2015/0371324 A1 * | 12/2015 | Kumar | G06F 15/00 | 705/26.3 |
| 2015/0379089 A1 * | 12/2015 | Kotlyarov | G06F 16/3332 | 707/771 |
| 2016/0321261 A1 * | 11/2016 | Spasojevic | G06F 16/24578 | |
| 2016/0328402 A1 * | 11/2016 | McIntosh | G06F 16/338 | |
| 2016/0350404 A1 * | 12/2016 | Smith | G06F 16/334 | |
| 2017/0147546 A1 * | 5/2017 | Ishii | G06F 40/289 | |
| 2017/0244652 A1 * | 8/2017 | Clarke | H04L 51/02 | |
| 2017/0322970 A1 * | 11/2017 | Alexander | G06F 3/0482 | |

OTHER PUBLICATIONS

Fields, "Spritz Speed Reading App Promises You Can Read a Novel in 90 Minutes", Mar. 7, 2014; http://abcnews.go.com/Lifestyle/speed-reading-technology-read-90-minutes/story?id=22819573.

* cited by examiner

DETAILS – OBJECT RECOGNITION BASED ON MULTIPLE CUSTOMIZED FOCUSES

RECOGNITION OF ONE TOUCH

- 302 — TOUCHED RANGE IDENTIFY
- 304 — TEXT EXTRACTION FROM A TOUCHED ROUGH RANGE
- 306 — OBJECT RECOGNITION BASED ON THE PARSER AND NAMED ENTITY RECOGNIZER (NLP)
- 310 — FILTER WITH INDIVIDUAL HISTORICAL IO
- 312 — FILTER WITH OTHER USERS' IO OF THE SAME PARAGRAPH

326 — TOUCHED RANGE: "iness unit focused on the health care industry, built upon the foundation of the day, we are officially launching IBM Watson Health. This team of consultants, ners will work with an extensive ecosystem of partners and clients to advance advanced data analysis and insig..."

322 — Press
324, 330, 320

332 — TEXT EXTRACTED FROM THE TOUCHED RANGE:
"A BUSINESS UNIT FOCUSED ON THE HEALTHCARE INDUSTRY"
"LAUNCHING IBM WATSON HEALTH"
"AN EXTENSIVE ECOSYSTEM OF PARTNERS AND CLIENTS"

334 — OBJECTS BY TRADITIONAL WORD PARTITION:
"BUSINESS UNIT  HEALTHCARE INDUSTRY
IBM WATSON HEALTH
ECOSYSTEM  PARTNERS  CLIENTS"

340 — INDIVIDUAL HISTORICAL IO:
BIG DATA [0.5]
ECOSYSTEM [0.9]

342 — OTHER USERS' IO  NUMBER IN BOX: WEIGHT
WATSON [0.8]
HEALTHCARE INDUSTRY [0.9]
CLIENTS [0.7]

344 — FILTER BY THRESHOLD:
ECOSYSTEM [0.8]  WATSON [0.9]
HEALTHCARE INDUSTRY [0.8]
CLIENTS [0.7]

350 — RECOMMEND: CLIENTS [0.7]

RECOGNIZED OBJECTS OF THIS TOUCH

RECOMMENDED OBJECTS ARE THOSE THAT DON'T APPEAR IN THE TOUCHED AREA, BUT ARE HIGHLIGHTED BY OTHER USERS IN THE SAME PARAGRAPH.

INTEREST HIGHLIGHT AND RECOMMENDATION BASED ON INTERACTION IN LONG TEXT READING

BACKGROUND

This invention generally relates to highlighting or recommending text to a user looking at a document on a display screen. Embodiments of the invention are well suited for recommending text to a user looking at a lengthy document on a small display screen such as a mobile communications device.

People today often read or look at lengthy documents on display screens. Often people are not interested in an entire document, but only in a part of the document or in some of the topics or sub-topics discussed in the document. More and more commonly, people use small display screens such as those on mobile phones or tablets to look at lengthy documents. Navigating through very lengthy documents on a small video screen can be difficult. Typically, the screen is very small, so that users need to scroll many times to finish reading a long document. Further, users usually read lines of text at a glance; and when scrolling a long document, this may lead to misreading or misunderstanding the text. Also, readers often read a document on a mobile phone over a number of separate, brief periods of time; and when a reader wants to resume reading a text, it is difficult for a reader to find quickly his or her interested term/sentence/paragraph in long text. There is a need to recommend text to a user looking at a lengthy document on a small display screen.

SUMMARY

Embodiments of the invention provide a method, system and computer program product for recommending terms in a document based on a specified interaction with the document. In one embodiment, the method compromises displaying a document on a device, and detecting a specified interaction with the document displayed on the device. Text associated with the specified interaction with the document displayed on the device is identified. Object recognition is performed with the identified text to recognize one or more defined interested objects. Terms in the document are recommended based on the recognized defined interested objects.

Embodiments of the invention provide a system for recommending terms in a document based a specified interaction with the document. The document is shown on a display screen of a device. In an embodiment, the system comprises a text identifier for detecting a specified interaction with the document displayed on the device. An object recognizer is provided for performing object recognition with the identified text to recognize one or more defined interested objects, and for recommending terms in the document based on the recognized defined interested objects.

BRIEF DESCRIPTION OF THE DRAWINGS

FIG. 6 shows a procedure for object recognition based on a user interaction with a text display.

DETAILED DESCRIPTION

Figure 1:
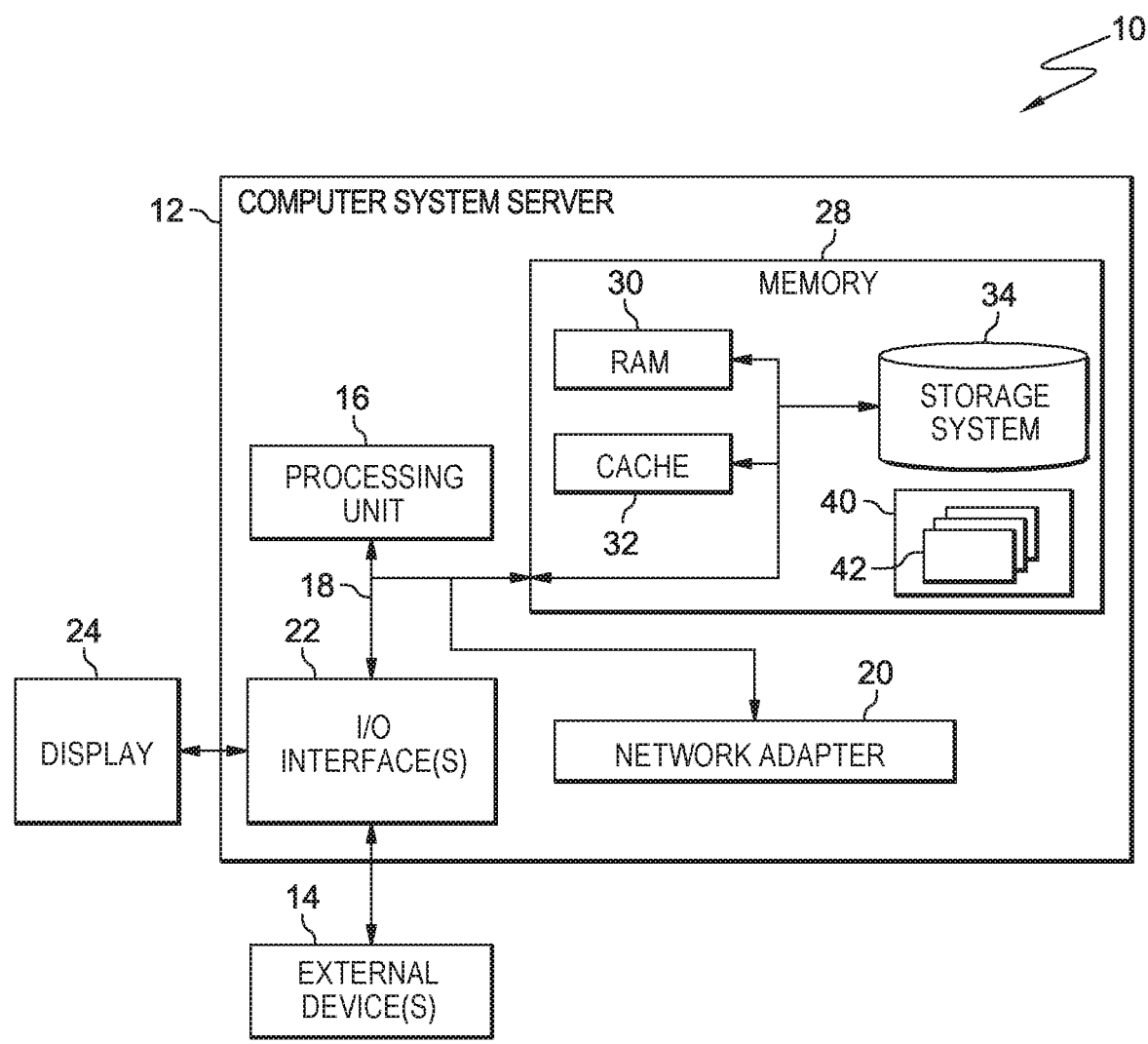
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services)that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
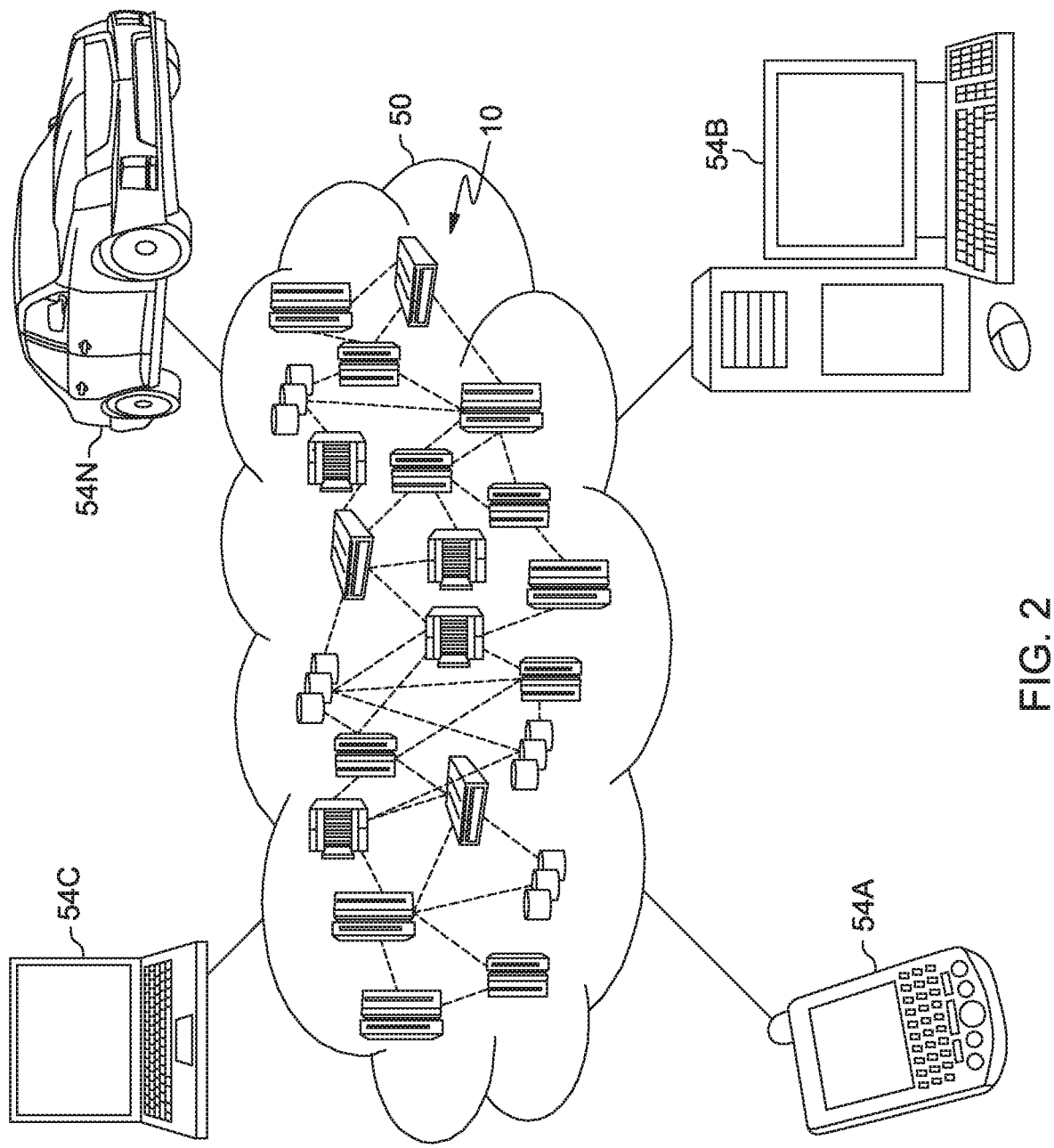
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
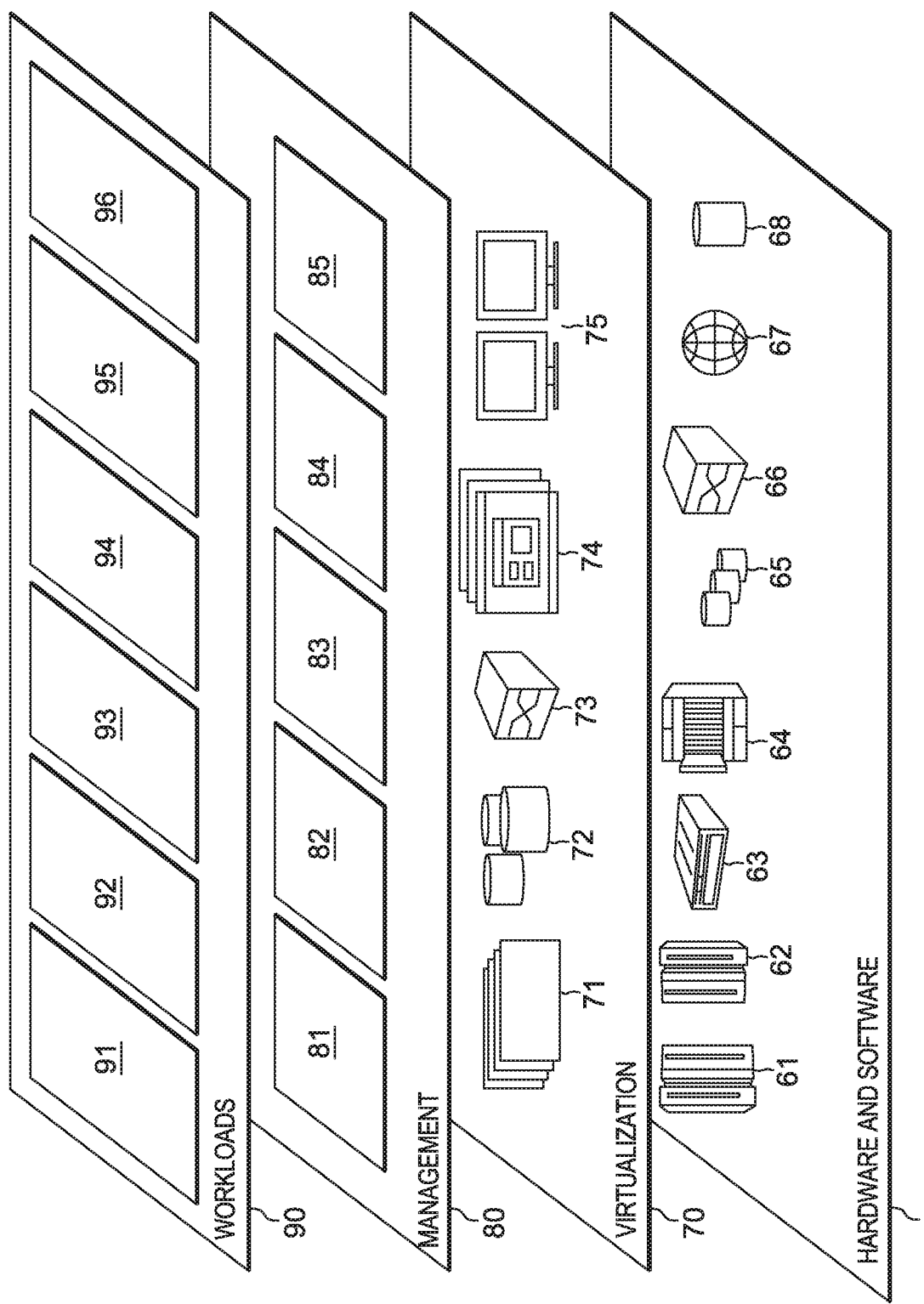
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto.

As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and interest highlight and recommendation based on touch interaction in long text reading 96.

This invention generally relates to highlighting or recommending text to a user looking at a document on a display screen. Embodiments of the invention are well suited for recommending text to a user looking at a lengthy document on a small display screen such as a mobile communications device.

A significant amount of time and effort, both physical and mental, may be needed to read or look through a long text on a small display screen, and even with this effort, readers may still miss important information. To address the difficulties with long text reading, traditionally users can read the abstract of the text, search the key words by himself, or edit a favorites topics and get the recommendations according to these topics. Each of these has disadvantages, though.

While an abstract may give some useful information, it might not discuss each user's interests. A key word search is usually too restricted to provide enough information. Furthermore, in many cases, users do not know exactly what they want to search for. Some applications support a favorites topics and may find out a user's favorite topics automatically. However, predefined topic tags are static. Every user has his or her own interests.

Additionally, a user may read related documents that are usually identified or recommended at the bottom or end of a document. These recommendations only identify documents, though, and do not recommend particular paragraphs or other selected portions of documents, and thus may not be particularly helpful in pointing a reader to specific paragraphs of documents that are of interest to the reader. Also, predefined related text recommendations are not customized by the user.

In embodiments, the invention provides methods and systems to highlight to a user terms of interest in a long text based on the user's touching interaction with a display of that long text. The long text may be shown on a display screen of, for example, a mobile phone. In embodiments, the invention identifies the touched range of the user in the long text, extracts the text in that range, and performs object recognition on the extracted text. During the object recognition, objects from the user's individual historical database of interested objects (IOs) and interest objects of other users from the same paragraph of the long text may be used as filters to keep the most probable objects for the user and to remove other objects.

The object recognition process may be performed many times based on a user's multiple touches of the displayed long text, and may keep several IOs in an IO box on the top of the mobile screen. In the IO box on the display screen, the system may recommend IOs other users' IOs of the same long text. The user can add or remove IOs to or from the IO box by gestures. A user can use the final IOs in the box as his or her knowledge management input. The sentences and paragraphs related to these final IOs can also be highlighted as user's notes.

Figure 4:
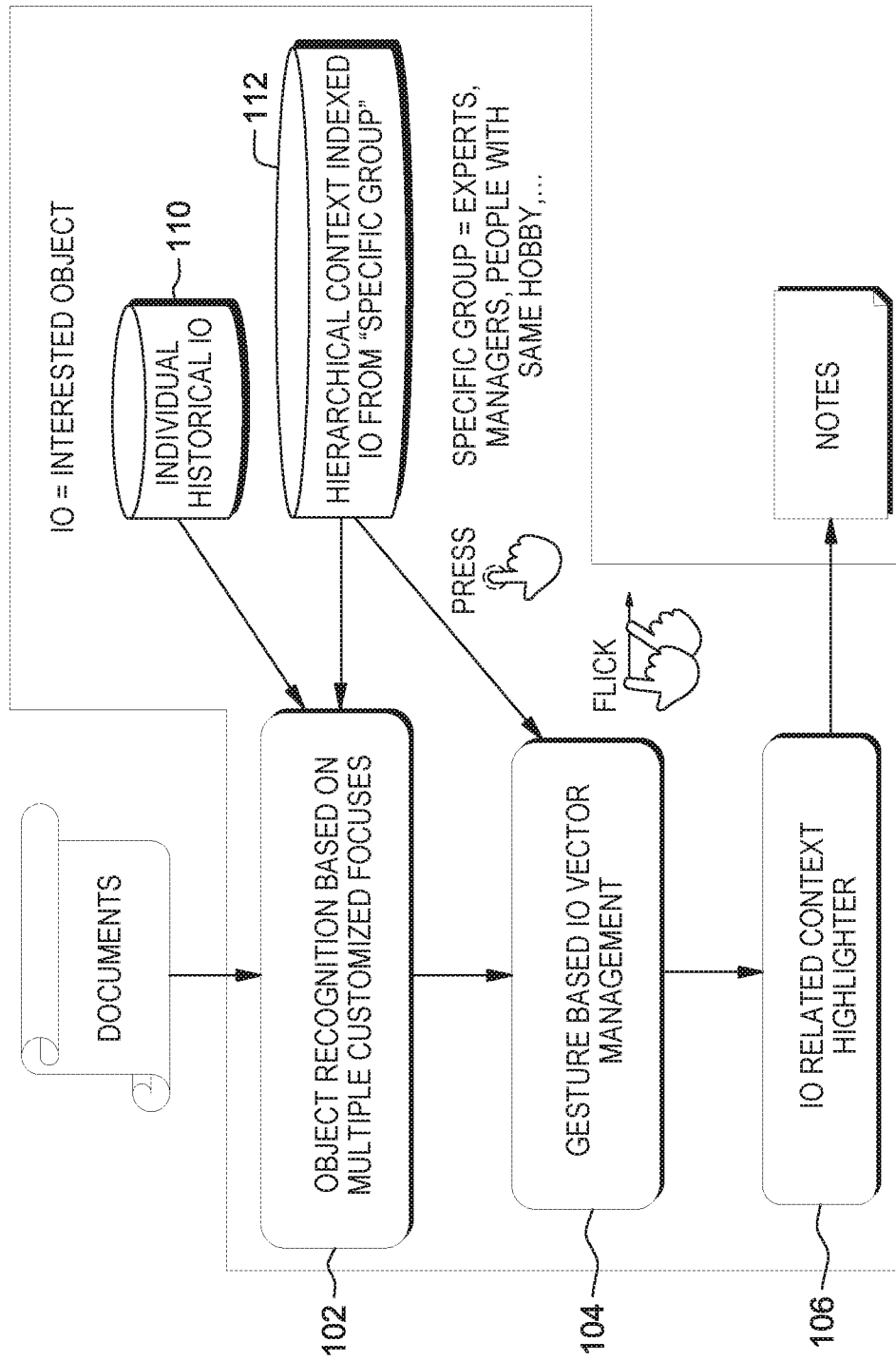
FIG. 4 illustrates components of a methodology for recommending text in accordance with an embodiment of the invention.

FIG. 4 illustrates components of a methodology embodying this invention. These components include object recognition 102 based on multiple customized focuses of the user, gesture based interested object (IO) vector management 104, and IO related context highlighter 106. Embodiments of the invention also maintain, for each user, a database 110 of individual hierarchical interested objects, and a database 112 of hierarchical context indexed interested objects from one or more specific groups. These specific groups may be, for example, experts in a particular field or area, managers of a particular type in a specified business or field, or managers of the user, or a group of people who have the same hobby as the user.

Figure 5:
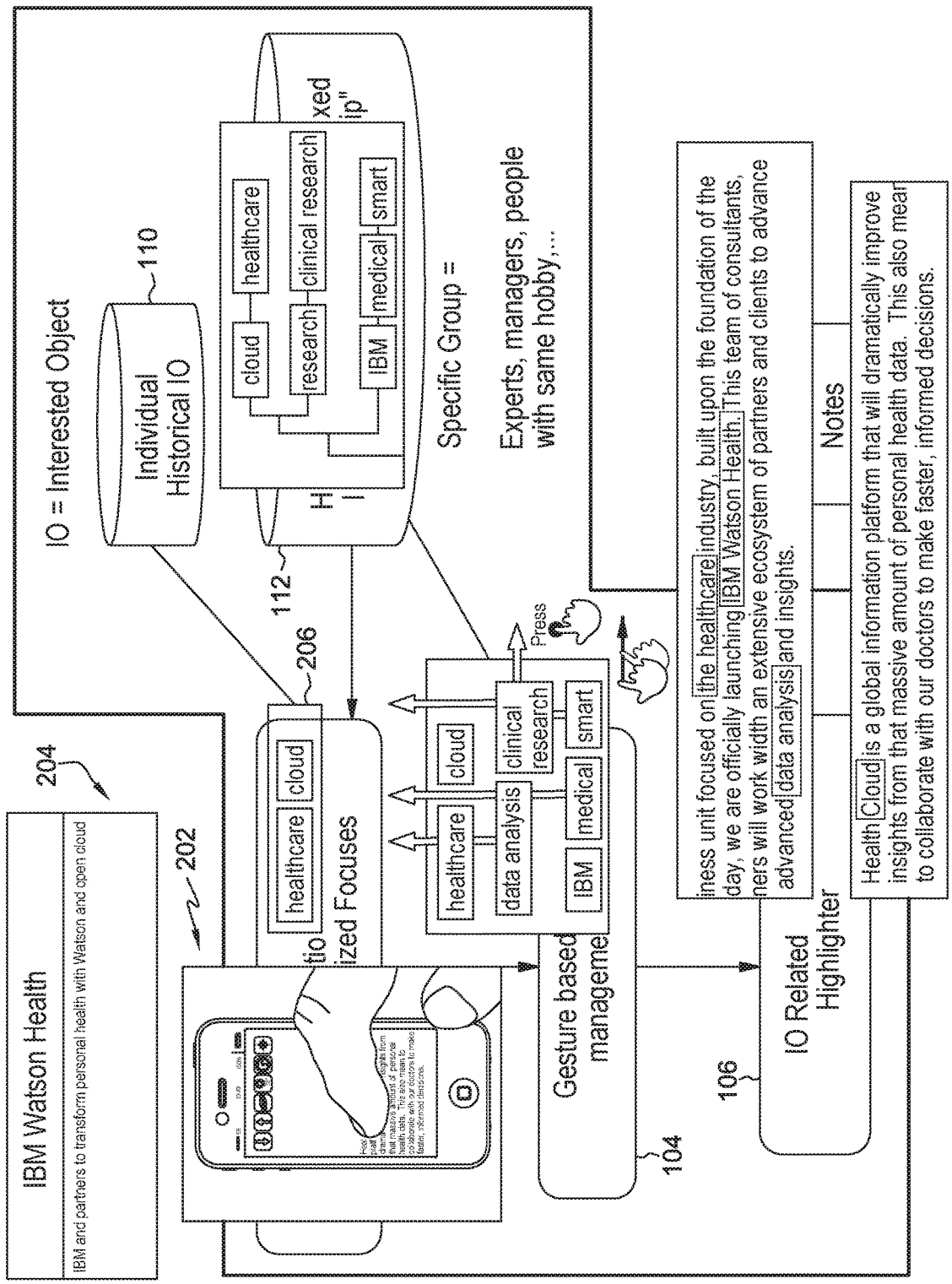
FIG. 5 shows an example of the methodology of FIG. 4.

FIG. 5 illustrates an example of an embodiment of the invention. In this example, text is being displayed on a mobile device 202, and a user touches a part of the text. A portion of the text, shown at 204, around the touched area is identified.

Words in this identified portion of the text are compared to pre-identified interested objects to determine which ones of those interested objects are present in the identified text. These pre-identified interested objects may be from two sources or databases. One source 110 is the user's own historical interested objects, and a second source 112 is interested objects from other people.

The database 110 may be formed by interested objects of the user over time. These interested objects may have been input by the user, or identified from previous interactions of the user with other long texts. Database 112 may be formed by receiving interested objects from other people. These other people may be a group of people who have a specific relationship with the user, or with the long text being looked at by the user.

In the example shown in FIG. 5, the words, shown at 206, extracted from the text area touched by the user are "healthcare" and "cloud."

FIG. 6 shows an object recognition process based on multiple customized focuses. The left hand side of FIG. 6 shows object recognition of one touch, and the right hand side of FIG. 6 shows an example of this process.

At step 302 of the process, the touched range of the document is identified; and at step 304, text is extracted from this touched range or from a defined area around that touched range. At step 306, object recognition is performed based on a parser and a named entity recognizer. Natural language processing (NLP) may be used to perform this object recognition.

The recognized objects may then be filtered at 310 and 312. More particularly, the user's individual historical interested objects, for instance from database 110, may be used as a filter at 310, and interested objects, for example from database 112, of other people derived from the same paragraph of text may be used as a filter at 312.

The right hand side of FIG. 6 illustrates an example of the process shown on the left hand side of the Fig.

In this example, a user 320 touches an area 322 of a long text 324 shown on a display screen 326. A larger area 330 around that touched area 322 is determined, and text is extracted from that larger area. In this example, three phrases, listed at 332, are extracted: (1) "a business unit focused on the healthcare industry"; (2) "launching IBM Watson Health"; and (3) "an extensive ecosystem of partners and clients."

Objects are formed from these phrases by traditional word partition. In this example, these objects, listed at 334, include: business unit, healthcare industry, IBM, Watson, Health, ecosystem, partners, and clients.

These objects are filtered with the user's individual historical IO 340, and with other users' IO 342 of the same paragraph of the text. In this example, the user's individual historical IO includes "big data" and "ecosystem," and thus "ecosystem" is taken from the objects listed at 334 and put into IO list 344. Also, the other users' IO include "Watson" and "healthcare industry," and thus these two terms are taken from the objects listed at 334 and put into IO list 344.

In addition, in this example, each of the interested objects in the databases 340 and 342 has a weight; and if one of these IOs is recognized in the extracted text, the recognized object is given the weight of the matching IO in the database. In the example shown in FIG. 6, "ecosystem" is given a weight of 0.9, "Watson" is given a weight of 0.8, "healthcare industry" is given a weight of 0.9, and "clients" is given a weight of 0.7.

In this example, the interested objects that are recommended to the user are those that do not appear in the touched area 324 but which are highlighted by other users in the same paragraph of the document. Hence, in this example, as illustrated at 350, "clients" is recommended to the user.

Figure 7:
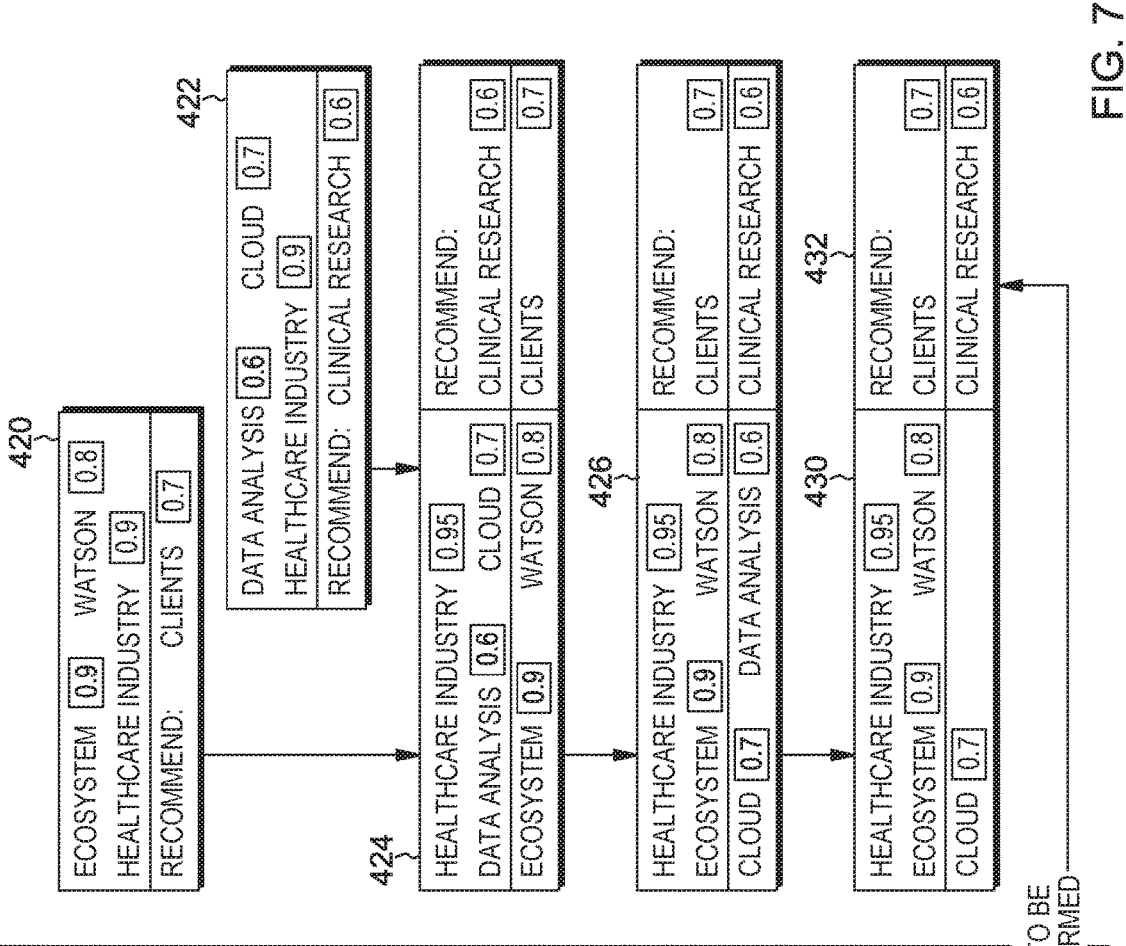
FIG. 7 illustrates a method for object recognition based on multiple interactions of a user with a text display.

FIG. 7 shows a procedure 400 for object recognition based on multiple touches by the user.

In this procedure, for each touch, the method of FIG. 7 is used to identify a set of IOs. Thus, after the first touch, a set of IOs, represented at 402, is determined. For each subsequent touch, a set of IOs, represented at 404, are found. In the process of FIG. 7, at 406, the objects related to the IOs from previous touches and the IOs from the current touch are found and the weights of these found related objects are increased. At 410, the objects are sorted by weight; and at 412, a given number of the top objects, ranked by weight, are kept and the other objects are removed.

The right hand side of FIG. 7 shows an example of the process illustrated on the left hand side of the Fig.

In this example, the set of IOs 420 from previous touches includes "ecosystem," "Watson," "healthcare industry" and "clients"; and the set of IOs 422 of the current touch includes "data analysis," "cloud," "healthcare industry" and "clinical research." Each of these IOs has a weight.

At 424, related objects are found and their weights are increased. In this example, the only related objects are the two occurrences of "healthcare industry." The two sets of IOs are combined to form set 426; and in this set, the weight of "healthcare industry" is increased to 0.95.

At 430, the IOs having the top five weights are kept, and "data analysis" is removed. Also, another parallel process may be performed for the Recommended Object Box 432, to keep the words to be recommended to users but which have not yet been confirmed.

Figure 8:
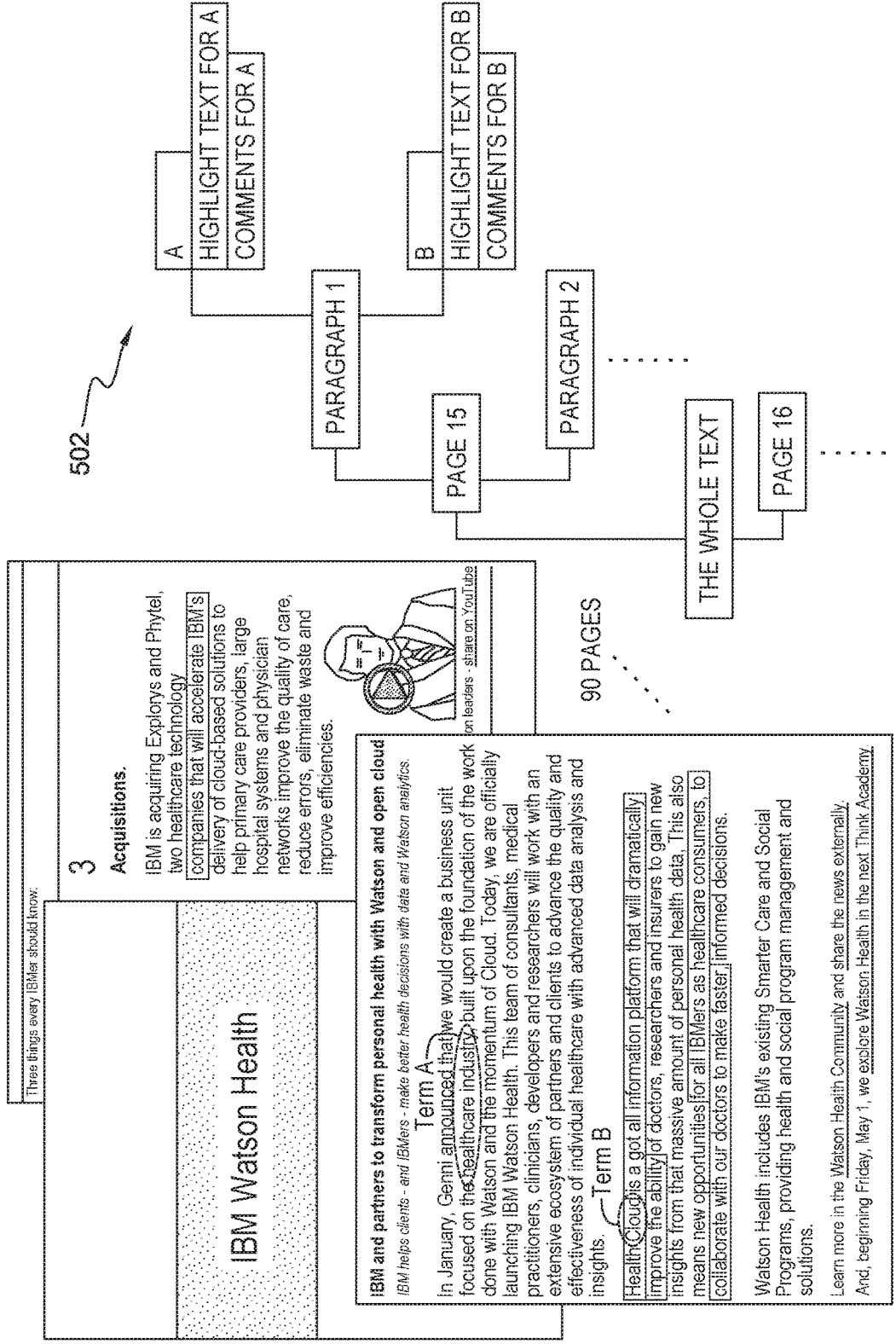
FIG. 8 shows a procedure for identifying

FIG. 8 shows a procedure for forming a hierarchical context indexed IO 502 from a specific group of people. As mentioned above, this specific group may be, for instance, a group of experts in a particular field, or a group of people who have a particular relationship to the user or to the subject matter of the long text.

With the procedure shown in FIG. 8, a list is maintained for each person in the group of each term highlighted by that person. The list may be organized by pages or by paragraphs of the long text. With the example shown in FIG. 8, a person has highlighted text for terms A and B in paragraph 1 on page 15 of the long text. This person has also provided comments for each of these terms A and B.

Figure 9:
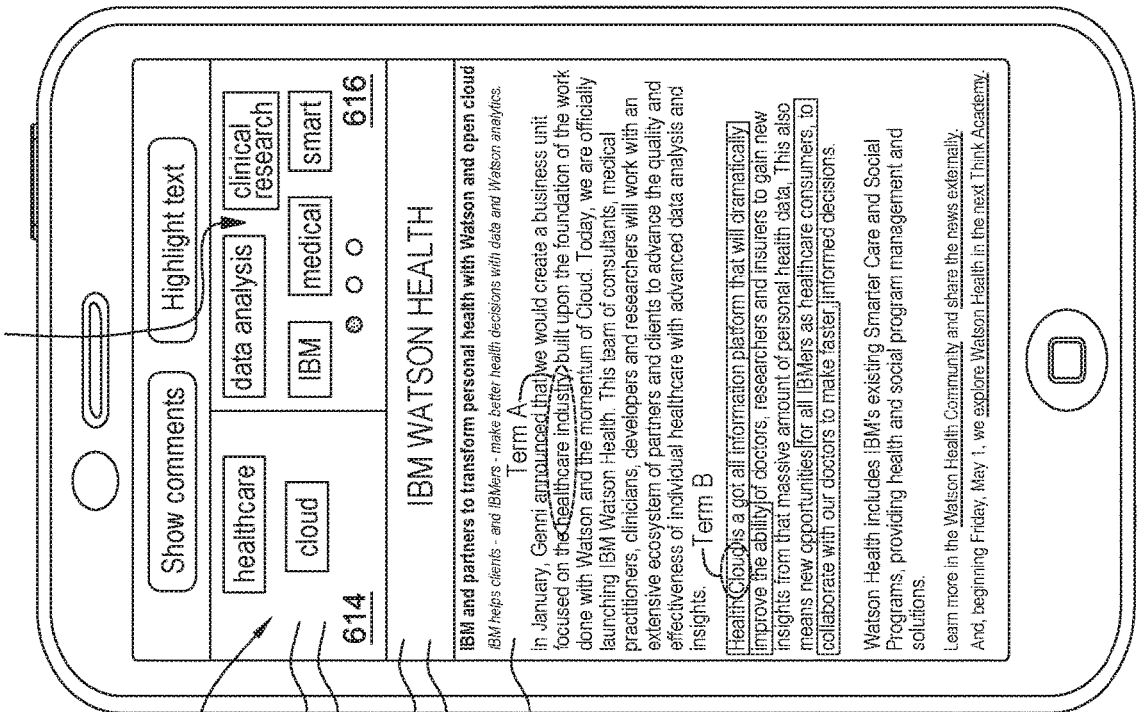
FIG. 9 illustrates gesture based interest object vector management.

As mentioned above, in embodiments of the invention, a user may edit his or her individual list of IOs using the mobile device. FIG. 9 shows a procedure for doing this.

More specifically, FIG. 9 shows a mobile device 602 including a display screen 604. The display screen shows a portion of a long text 606 and an IO box 610 that lists IOs 612. With the embodiment shown in FIG. 9, the IO box includes a number of sections. One section 614 shows a group of IOs referred to as "my IOs," and a second section 616 shows a group of IOs referred to as "recommended IOs."

In embodiments of the invention, gesture interaction with the display screen is used to edit the IO terms. For example, to add a term to the "my IO" group, the user, as illustrated at 622, presses that term in the text for a defined period of time. That term is then automatically added to the "my IO" group. To delete an IO from the "my IO" group, the user, as illustrated at 624, presses on that term with a finger and, for example, flicks the finger downward.

To add an IO to the "my IO" group from the "recommended IO" group, the user, as represented at 626, uses a finger to press on that term in the "recommended IO" group and, for example, flicks the finger to the right. To remove an IO from the "recommended IO" group, the user, as represented at 630, presses on that term with a finger and flicks the finger downward.

Figure 10:
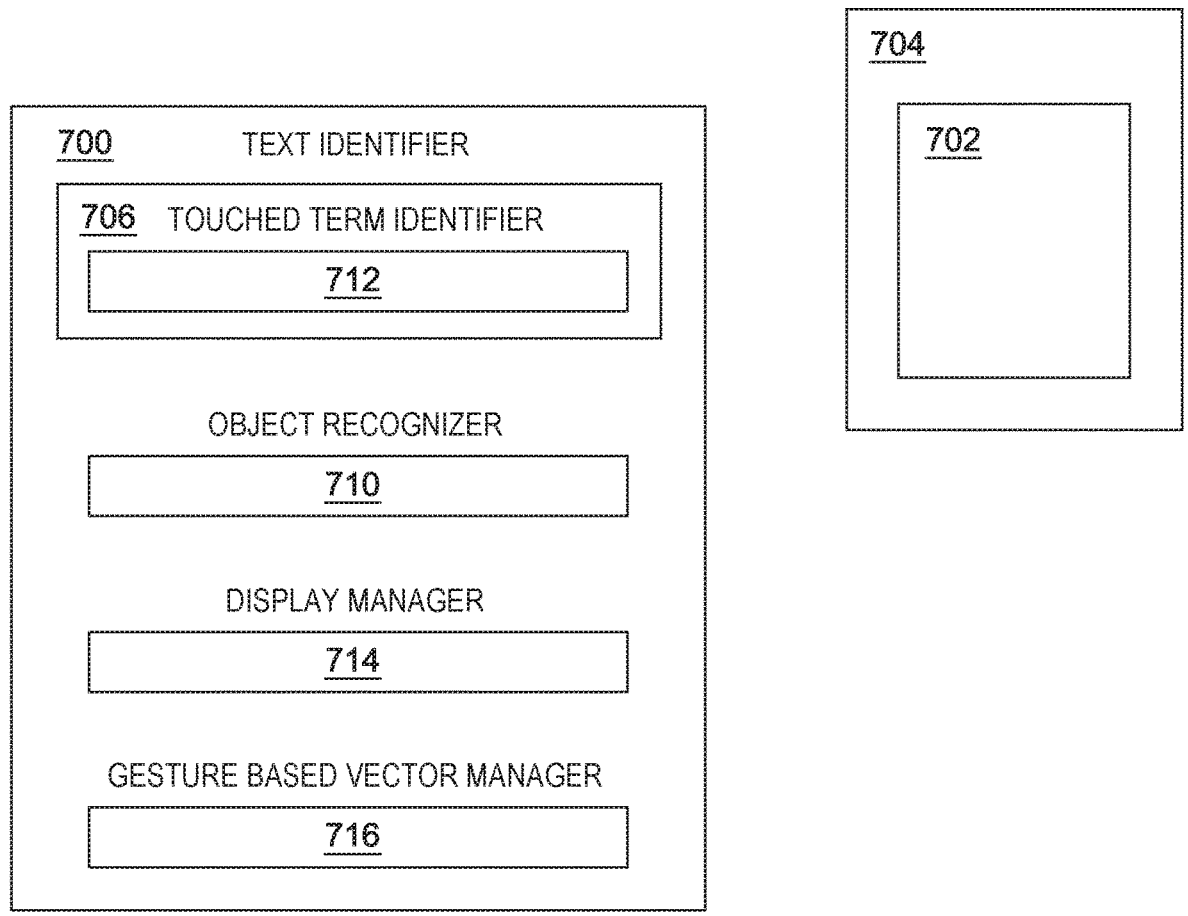
FIG. 10 shows components of a system embodying the invention.

As mentioned above, the invention may also be embodied in a system for identifying terms in a document to recommend to a user based on a user's interaction with a device, and FIG. 7 shows components of one embodiment of the system 700. As illustrated in FIG. 10, the document is shown on a display screen 702 of the device 704, and system 700 comprises a text identifier 706 and an object recognizer 710. The text identifier is for detecting a specified interaction of the user with the device 704, and using said detecting to identify text in the document. The object recognizer 710 is for performing object recognition with the identified text to recognize one or more interested objects to recommend to the user for the user to look at in the document.

In an embodiment, the text identifier includes a touched term identifier 712 to identify the text in the document based on detecting the user touching the display of the document on the device. In addition, in embodiments, system 700 further comprises a display manager 714 and a gesture based vector manager 716. The display manager is used to form a display of a list of a group of the predetermined objects. The gesture based vector manager is for managing the display of the list by adding one or more of the predetermined interested objects to the list, and removing one or more of the predetermined objects from the list based on specified detected gestures of the user.

As will be understood by those of ordinary skill in the art, in embodiments of the invention, some or all of the components of the system may be on or part of device, which, as mentioned above, may be a mobile device. Other arrangements may also be used, however; and in embodiments, components of the system may be separate from the device on which the document is shown.

Any suitable mobile devices may be used in embodiments of the invention. The mobile devices are representative of any appropriate type of device that include a smart phone, a cell phone, a portable phone, a Session Initiation Protocol (SIP) phone, a video phone, or single-purpose mobile devices such as eBooks. The mobile device may also be a portable computing device, such as a tablet computer, laptop, a personal digital assistant ("PDA"), a portable email device, a thin client, a portable gaming device, etc.

In embodiments of the invention, the actual interested objects can be customized by interaction between users and mobile screens. A user can identify his or her individual interest by touching a term on a mobile screen. Alternatively, the user can touch multiple terms or touch one or more terms multiple times to identify his or her actual interest.

Considering that the touching action on a mobile screen may lead to wrong term recognition, embodiments of the invention use techniques to discover the object the user wants. In addition to using boundary recognition techniques, embodiments of the invention also use insight from the behavior of a user and from the behavior of other users to identify terms and objects of interest to a user.

A summary of experience from other users can help users quickly find what they are interested in. These other users may be experts in a field, people with the same hobby as a user, or all other people. In embodiments of the invention, the object recommendation can be based on the touching/highlighting of text by other users on a mobile device. A particular user may not have enough time or may not have enough experience to identify the importance of a text. That user may want to know what has been the focus of other users on the same text.

Figure 11:
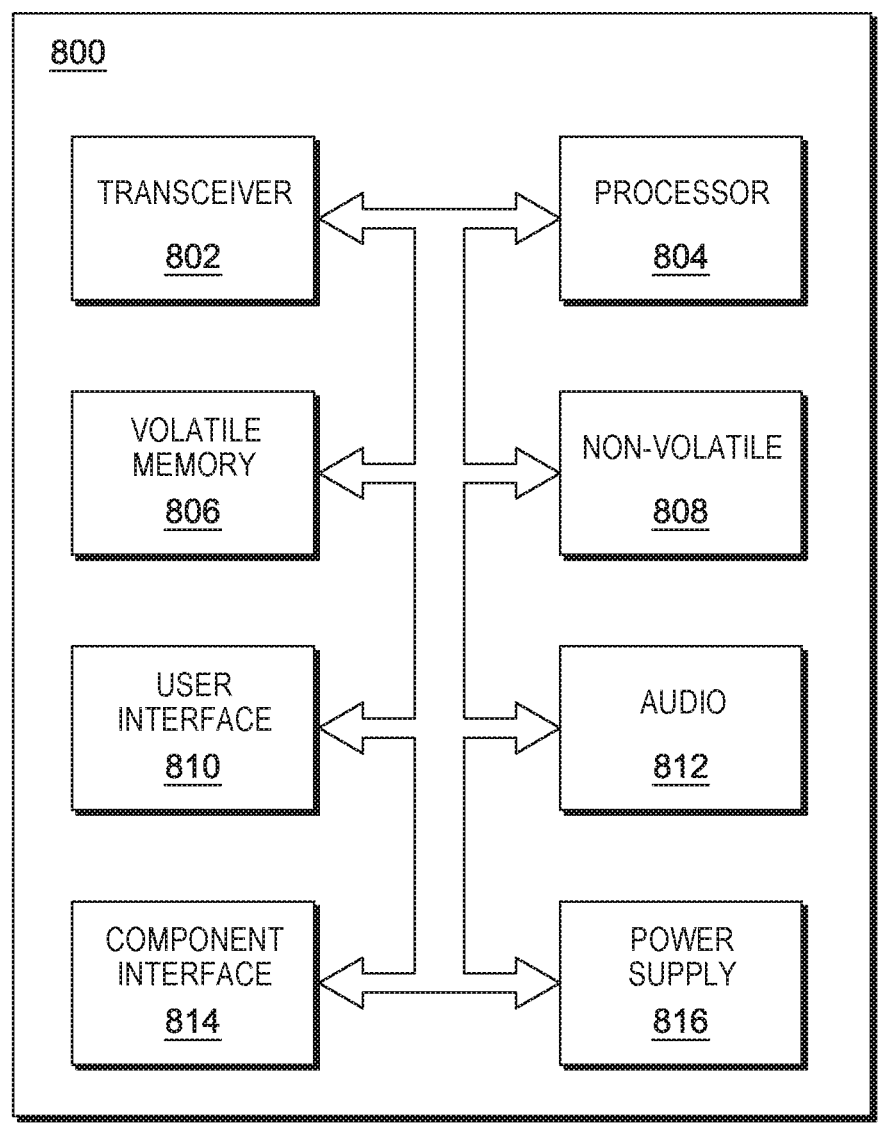
FIG. 11 is a block diagram illustrating a mobile communications device that may be used in the embodiments of the invention.

FIG. 11 illustrates in a block diagram one embodiment, as an example, of a mobile communications device 800 that may be used in embodiments of the invention. Generally, device 800 includes transceiver 802, processor 804, volatile memory 806, a non-volatile memory 808, user input interface 810, a user output device 812, component interface 814, and power supply 816.

In embodiments of the invention, mobile device 800 is capable of accessing one or more networks, which may be a cellular phone network or a computer network, and the mobile device may also support one or more applications for performing various communications with a cellular or computer network. The mobile device 200 may be a wireless device and may receive or transmit data and signals wirelessly.

Transceiver 802 is capable of sending data to and receiving data from a network to which the mobile device is connected. Processor 804 executes stored programs, and volatile memory 806 and non-volatile memory 808 are available to and used by the processor 804. User input interface 210 may comprise elements such as a keypad, display, touch screen, and the like. User output device may comprise a display screen and an audio interface 812 that may include elements such as a microphone, earphone, and speaker. Component interface 814 is provided to attach additional elements to the mobile device such as a universal serial bus (USB) interface.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method for recommending terms in a document based on a specified interaction with the document, the method comprising:
   displaying a document on a device of a computer system;
   detecting, by a text identifier of the computer system, a specified interaction of a user with the document displayed on the device;
   identifying, by the text identifier of the computer system, text associated with the specified interaction of the user with the document displayed on the device;
   extracting objects from the identified test using natural language processing and an object recognizer of the computer system, including
      extracting phrases from the identified text, and
      forming objects from the extracted phrases using the natural language processing;
   recognizing one or more interested objects, of a determined group of interested objects, from the identified text, including
   filtering the formed objects with said determined group of interested objects, to form a filtered group of objects comprising said one or more interested objects from the identified text, including
      displaying on the device a first group of interested objects,
      the user using the display of the first group of interested objects to add one or more additional interested objects to the first group of interested objects, and to remove one or more of the interested objects of the first group of interested objects form said first group of interested objects to form said determined group of the interested objects, including
         displaying a second group of interested objects on the device,
         assigning a weight to each of the interested objects in the first and second group of interested objects,
         in each of the first and second groups of interested objects, sorting the interested objects in said each group by the weights of the interested objects,
         in each of the first and second groups of interestted objects, removing from said each group one or more of the interested objects of said each group based on the weights of the interested objects of said each group, and
         the user interacting with the display of the second group of interested objects to move one or more of the interested objects from the second group of interested objects to the first group of interested objects; and
      putting into said filtered group of objects ones of the formed objects that are present in the determined group of interested objects; and
   recommending terms in the document based on the filtered group of the objects formed from the objects extracted from the identified text.

2. The method according to claim 1, wherein the forming objects from the extracted phrases include:
   partitioning the extracted phrases to identify said objects from the extracted phrases.

3. The method according to claim 1, wherein the first group of interested objects are derived from defined actions of the user, and the second group of interested objects are obtained from a specified group of people.

4. The method according to claim 1, wherein the identifying text associated with the specified interaction with the document displayed on the device includes:
   using the specified interaction of the user with the specified device to identify an area of the document; and
   selecting text in said area of the document.

5. The method according to claim 4, wherein the specified interaction with the device is a user touching the display of the document on a display screen of the device.

6. The method according to claim 5, wherein:
   a user touching the display of the document on a display screen of the device includes the user touching an area of the display of the document; and
   the identified area of the document is a specified area around said touched area.

7. The method according to claim 1, wherein:
   the determined group of interested objects include a first set of interested objects derived form defined actions of the user, and a second set of interested objects obtained from a specified group of people;
   the specified interaction with the device is the user touching an area of the display of the document on a display screen of the device;
   the identified area of the document includes the touched area of the display of the document, and a larger area around said touched area; and
   the putting into said filtered group of objects ones of the formed objects that are present in the determined group of interested objects includes putting into said filtered group of objects ones of the second set of interested objects that do not appear in said touched area of the display and do appear in said larger area around said touched area.

8. The method according to claim 1, wherein the assigning a weight to each of the interested objects in the first and second groups of ionterested objects includes, when one of the interested objects in the determined group of interested objects matches one of the formed objects, increasing the weight of said one of the interested objects.

9. The method according to claim 1, for use with one or more databases storing a plurality of interested objects, each of the plurality of interested objects stored in the database having a weight, and wherein:
   when any one of the formed objects matches one of the interested objects in said one or more databases, giving the one of the formed objects the weight of the matching one of the interested objects in said one or more databases.

10. A system for recommending terms in a document based on a specified interaction with the document, wherein the document is shown on a display screen of a device, the system comprising:
    a memory for storing data, and
    one or more processing units connected to the memory for transmitting data to and receiving from the memory, the one or more processing units configured for:
       a text identifier for detecting a specified interaction of a user with the document displayed on the device, and identifying text associated with the specified interaction of the user with the document displayed on the device; and an object recognizer for extracting objects from the identified text using natural language processing and, including
extracting phrases from the identified text, and
forming objects from the extracted phrases using the natural language processing,
the object recognizer for recognizing one or more interested objects, of a determined group of interested objects, from the identified text, including
filtering the formed objects with said determined group of interested objects, to form a filtered group of objects comprising said one or more interested objects from the identified text, including
displaying on the device a first group of interested objects,
using the display of the first group of interested objects to add one or more additional interested objects to the first group of interested objects, and to remove one or more of the interested objects of the first group of interested objects from said first group of interested objects to form said determined group of the interested objects, including
displaying a second group of interested objects on the device,
assigning a weight to each of the interested objects in the first and second groups of interested objects,
in each of the first and second groups of interested objects, sorting the interested objects in said each group by the weights of the interested objects,
in each of the first and second groups of interested objects, removing from said each group one or more of the interested objects of said each group based on the weights of the interested objects of said each group, and
the user interacting with the display of the second group of interested objects to move one or more of the interested objects from the second group of interested objects to the first group of interested objects; and
putting into said filtered group of objects ones of the formed objects that are present in the determined group of interested objects; and
recommending terms in the document based on the filtered group of the objects formed from the objects extracted from the identified text.

11. The system according to claim 10, wherein the text identifier includes:
a touched term identifier to identify said text in the document associated with the specified interaction with the document displayed in the device based on detecting a user touching the display of the document on the device.

12. The system according to claim 10, wherein the object recognizer filters said recognized one or more defined interested objects by using an individual historical IO database storing interested objects derived from defined actions of a user, and hierarchical context indexed interested objects from a specified group of people.

13. The system according to claim 10, further comprising:
a display manager to form a display of a list of a group of the defined interested objects; and
a gesture based vector manager for managing the display of the list of the predetermined group of the defined interested objects by adding one or more interested objects to the list, and removing one or more interested objects from the list based on specified detected actions of a user.

14. An article of manufacture comprising:
at least one tangible computer readable medium having computer readable program code logic tangibly embodied therein to recommend terms in a document based on a specified interaction of a user with the document, the computer readable program code logic, when executing, performing the following:
displaying a document on a device;
detecting, by a text identifier of the computer system, a specified interaction with the document displayed on the device;
identifying, by the text identifier of the computer system, text associated with the specified interaction of the user with the document displayed on the device;
extracting objects from the identified text using natural language processing and an object recognizer of the computer system, including
extracting phrases from the identified text, and
forming objects from the extracted phrases using the natural language processing;
recognizing one or more interested objects, of a determined group of interested objects, from the identified text, including
filtering the formed objects with said determined group of interested objects, to form a filtered group of objects conprising said one or more interested objects from the identified text, including
displaying on the device a first group of interested objects,
using the display of the first group of the interested objects to add one or more additioinal interested objects to the first roup of interested objects, and to remove one or more of the interested objects of the first group of interested objects from said first group of interested objects to form said determined group of the interested objects, including,
displaying a second group of interested objects on the device,
assigning a weight to each of the interested objhects in the first and second groups of interested objects,
in each of the first and second grooups of interested objects, sorting the interested objects in said each group by the weights of the interested objects,
in each of the first and second groups of interested objects, removing from said each group one or more of the interested objects of said each group based on the weights of the interested objects of said each group, and
the user interacting with the display of the secvond group of interested objects to move one or more of the interested ojbects from the second gorup of interested objects to the first group of interested objects; and
putting into said filtered group of objects ones of the formed objects that are present in the determined group of interested objects; and
recommending terms in the document based on the filtered group of the objects formed from the objects extracted from the identified text.

15. The article of manufacture according to claim 14, wherein the filtering said identified one or more objects identified from the identified text includes:

maintaining a list of the predetermined interested objects; and managing said list by adding one or more interested objects to the list, and removing one or more of the interested objects from the list based on specified, detected gestures.

16. The article of manufacture according to claim 14, wherein the specified interaction with the document displayed on the device is user touching the display of the document on a display screen of the device, and the identifying text associated with the specific interaction with the document displayed in the device includes:

using the user touching the display of the document on the display screen of the device to identify an area of the document; and selecting text in said area of the document.

\* \* \* \* \*